Patented Jan. 7, 1930

1,742,794

UNITED STATES PATENT OFFICE

OLIVER W. STOREY AND MAX KLIEFOTH, OF MADISON, WISCONSIN, ASSIGNORS TO C. F. BURGESS LABORATORIES, INC., OF MADISON, WISCONSIN, A CORPORATION OF DELAWARE

WATER-RESISTANT COMPOSITION OF MATTER

No Drawing. Application filed April 1, 1927. Serial No. 180,836.

The present invention relates to the production of a water-resistant composition of matter from a mixture of a ground filler and sodium silicate wherein the sodium silicate is not changed chemically to an appreciable extent in the process of manufacture and does not react appreciably with the filler. It relates especially to the production of a water-resistant, porous, rigid, coherent mass by puffing the mixture of ground filler and a water solution of sodium silicate. The finished product is suitable for use as a building material.

In application, Serial No. 720,511, June 17, 1924, of our co-workers, H. F. Weiss and R. F. Norris, (now Patent No. 1,628,206, issued May 10, 1927) there is described a porous molded product which is produced by puffing quickly an intimate mixture of a filler and intumescent binder such as sodium silicate. A wall board made from this product is described in Weiss and Norris, Serial No. 720,510, June 17, 1924 (now Patent No. 1,655,718, issued Jan. 10, 1928).

In the production of the material described in those applications a dough-like mixture of an intumescent binder, such as sodium silicate, and a filler, is first made. The dough-like mixture is heated rapidly in a mold or between paper facings on heated platens to form a porous, rigid, coherent product. This product should preferably have a high resistance to water or moisture to be most useful in the arts, especially as wall boards.

We have discovered that the maximum resistance to moisture is obtained under certain limiting conditions, these conditions being particle size of the ground filler, composition of sodium silicate solution, and ratio of sodium silicate to filler. This discovery relates only to those mixtures wherein the chemical state of the sodium silicate remains practically unchanged in the final product and there is no appreciable reaction between the sodium silicate and filler. Not only does our discovery apply to a puffed product but it may also be applied to one which is not puffed. Our invention makes advantageous use of a ground limestone filler. The term "limestone" covers the wide variety of stones which may vary from almost pure calcium carbonate to those high enough in magnesium carbonate to be known as dolomite. We prefer using a dolomitic limestone.

When the ordinary solution of sodium silicate of commerce, such as is obtainable in quantity on the market, is mixed in proper proportions with a powdered filler, and subjected to the action of heat at a temperature somewhat above the boiling point of water, the mass expands, due to the formation of steam, and puffs into a porous mass. The structure or texture is similar to that of bread.

The ordinary solutions of sodium silicate of commerce are of necessity of such viscosity that they will flow rapidly from containers at room temperature. This is especially true of those sodium silicates in which the $SiO_2$—$Na_2O$ ratio varies between 2.6 to 1 and 3.4 to 1, the range to which our invention has been applied. The maximum viscosity of these commercial solutions in absolute units is less than 1000 centipoises at 25° C. In our invention we contemplate using, as a preferred embodiment, solutions having a viscosity of at least 2000 centipoises. In our viscosity measurements the Stormer viscosimeter was used, this being calibrated against castor oil, the viscosity of which was taken as 651 centipoises at 25° C., this value being given on page 24 of Technologic Paper No. 112 of the Bureau of Standards.

In general, it is necessary to make a dough-like mass at room temperatures to secure the best puffing conditions. If a thinner mixture is used the mass becomes too thin when heated and the walls of the cavities collapse and a poor structure results. If the proportion of filler is too large the walls of the cavities become stiff and the proper degree of porosity is not secured. It is preferable for the manufacture of wallboard and other materials that the puffed structure should weigh less than $62\frac{1}{2}$ pounds per cubic foot. Not only do the physical characteristics of the structure depend upon the proportion of filler to silicate of soda but also upon the fineness of the filler, composition of the silicate of soda and rapidity of puffing. We have discovered that the particle size of the filler determines largely the water-resistance of the final product provided that all comparative products have been heated to the same temperature. Our co-worker, A. W. Schorger, in application Serial No. 103,391, April 20, 1926, shows that a temperature of at least 210° C. is needed to give the best results with any particular mixture. At this temperature the silicate of soda is nearly dehydrated. Our results, as hereinafter detailed, are based on heating or heat treating at about 210° C.

We consider that a sodium silicate and filler porous composition of matter has the proper water resistance if it withstands immersion in water at a temperature of 90° C for thirty minutes without becoming soft.

We have discovered that if rock, or other solid material, such as limestone, and preferably dolomitic limestone, is ground to a powder, as by a ball mill, the structure resulting from use of this powdered filler has a water resistance depending largely upon the fineness of grinding. If a ground dolomitic limestone is used, such as is sold in considerable quantities for mixing in asphalt for paving purposes, the water resistance is low. Such a filler of which 82 per cent passes through a 200 mesh screen, has an average particle diameter or "size" of 12.1 microns. This diameter is determined by means of a microscope as described in Technical Paper 296 of the U. S. Bureau of Mines, entitled "Size and character of grains of nonmetallic mineral fillers". On an area basis such a filler has a high concentration of particle surface on those grains having diameters between 2.5 and 20 microns. If the average particle size is decreased somewhat by prolonged fine grinding the water resistance is greatly increased and becomes sufficient for most purposes. If the particle size is decreased by continued grinding so that it is below about 11.0 microns the water resistance becomes satisfactory. Water resistance does not appear to be a direct inverse function of particle size. A size which gives excellent results is between 9 and 10 microns or about 9.4 microns. We have used a very finely ground dolomitic limestone having an average particle diameter of 8.4 microns with excellent results. However, such exceedingly fine grinding is costly and it also increases the proportion of sodium silicate solution used, thereby increasing the cost. It is therefore desirable to use the coarsest grind consistent with satisfactory water resistance. Fillers which have given excellent results, both from the standpoint of cost and water resistance, have had a high concentration of particle surface between particle sizes of 0.8 and 10 microns, the maximum concentration being between 2.5 and 5.0 microns. The ground dolomitic limestone fillers are practically free of particles less than 0.8 micron in diameter.

Our invention does not contemplate the use of finely divided porous and precipitated materials such as clay, chalk, marl, lithopone, kieselguhr and the like as the principal filler. Such materials apparently absorb large amounts of moisture from sodium silicate solutions and cause the solutions to gel. Dough-like mixtures of these fillers and sodium silicate when heated become very fluid and a weak friable structure results which is entirely unsuited for most purposes, as for wallboards. When a filler is made by grinding a solid stone, such as limestone, to a fineness comparable to clay, the same difficulties appear. Our invention is therefore directed particularly to fillers which are made by grinding to within certain ranges of average particle size and to mixtures of these with small amounts of the previously mentioned porous or precipitated materials where the final average particle size of the mixture remains within the limits set by the appended claims.

The necessity of having a dough-like mix and sufficient sodium silicate to secure proper puffing, limits the viscosity of the sodium silicate solution which may be used. With sodium silicates having a ratio of $SiO_2$ to $Na_2O$ between 2.6 to 1 and 3.4 to 1 we have found that it is necessary to use a solution of sodium silicate which has a viscosity of about at least 2000 centipoises and a filler having an average particle size of between 8.4 and 11.0 microns to make a dough-like mix which will puff and result in a water-resistant porous composition of matter after being properly heat treated. By changing the ratio of the filler to the solution of silicate of soda the degree of porosity of the board changes and the water resistance varies to some extent. Decreasing the particle size of the filler also decreases the proportion of filler. As an example, a mix of one part silicate of soda and two parts dolomitic limestone having an average particle size of 9.5 microns gives about the same fineness of structure as a mix of one part silicate to 1.6 parts of dolomitic limestone having an average particle size of 9.0 microns or about 1.3 parts of dolomitic limestone having an average particle size of 8.4 microns. Increasing the viscosity of the sodium silicate solution above 2500 centipoises makes little change in the structure while commercial silicates, which are below 1000 centipoises, produce a coarse, weak, and easily disintegrated structure.

Sodium silicate solutions above a viscosity of about 1000 centipoises at 25° centigrade increase rapidly in viscosity for slight increases in the amount of dissolved silicate. We believe this is of much importance in this invention. As an example: in a solution in which the ratio of $Na_2O$ to $SiO_2$ is 2:82 to 1, a difference of water content of about 2 per cent raises the viscosity from 650 to 8000 centipoises. A solution of 2500 centipoises contains only about 0.30 per cent more water than one of 8000 centipoises.

In general, as the proportion of filler in the mix increases over the preferred proportions, the water resistance of the structure falls off. This falling off is small except where the structure becomes an important factor. As the proportion of filler increases the structure becomes finer, until finally a point is reached where the structure becomes crumbly. The crumbly structure disintegrates easily in hot water. As the proportion of filler in the mix is lowered, the structure becomes more coarse until it will not stay together under ordinary handling. In general, we prefer to keep the ratio of filler to solution of silicate of soda below 2.2 to 1 and preferably between about 1.2 to 1 and 2.2 to 1, the filler having an average particle size of between 8.4 and 11.0 microns. If the solutions have a viscosity greater than 2000 centipoises and the $SiO_2$—$Na_2O$ ratio is between 2.6 to 1 and 3.4 to 1, then the solutions contain from 0.38 to 0.17 parts of sodium silicate (anhydrous) for each part of filler, the finer particle sizes requiring the larger proportion of silicate. These figures are based on the analysis of the sodium silicate solutions. Solutions having a viscosity of between 2000 and 8000 centipoises will have the following average sodium silicate content:

| $SiO_2$—$Na_2O$ ratio | Sodium silicate content |
|---|---|
| 2.6:1 | 46% |
| 2.8:1 | 44% |
| 3.2:1 | 40% |
| 3.4:1 | 38% |

A dough-like mix at room temperature or about 25° C. should be used to secure best puffing results if the puffing heat is rapidly applied. This puffing is usually secured by using a temperature varying from 120° to 200° C. If the mix is made at higher than room temperature the mix may be more fluid due to the lower viscosity of sodium silicate at higher temperatures. A thinner silicate than is necessary to produce a dough-like mix may also be used to make the mix provided the amount of silicate in solution is sufficient to secure the proper puffing action, and provided further, the excess water is evaporated prior to puffing thereby giving a mix which is equivalent to the dough-like mix at 25° C. Our invention covers a dough-like mixture at 25° C. or the equivalent thereof at other temperatures or other concentrations of sodium silicate. A soap may also be incorporated in the mix to secure a better puffing action.

A porous mineral aggregate, such as is described in O. W. Storey application, Serial No. 103,392, April 20, 1926, may be added to the dough-like mix and a moisture-resistant product obtained after heat treating the puffed product. Such an aggregate may be a porous slag but should not appreciably increase the ratio of the amount of sodium silicate solution to finely ground filler when incorporated therewith. Such an aggregate, which need not be porous, will not decrease the water resistance of the resulting product but will decrease the cost by decreasing the amount of sodium silicate. The sodium silicate-filler composition acts as a binder or cement between the coarser particles of aggregate.

Although our invention relates especially to a puffed, porous, composition of matter, it may also be applied to sodium silicate compositions that are not puffed or only slightly puffed. If a puffable dough-like mix which is composed of a filler, such as a ground limestone, or brick dust, having an average particle size of between 8.4 and 11.0 microns, and a solution of high viscosity sodium silicate or its equivalent, is slowly air dried and then heated slowly to 210° C., this composition of matter has excellent water resistance and is much superior to those mixtures which are made with a coarser filler and a proportion of silicate not contemplated by our invention. Those mixtures which we have discovered to be highly resistant to moisture when the sodium silicate is nearly dehydrated will also show a much superior water resistance when allowed to harden at low temperatures.

Throughout the claims, the consistency of the dough-like composition of matter and the viscosity of the sodium silicate is specified at 25° C. Our invention, however, is not limited to mixtures and solutions at this temperature and covers mixtures of different consistencies and sodium silicate solutions of other viscosities at other temperatures equivalent to the specified description at 25° C.

We claim:

1. A water resistant composition of matter comprising an intimate mixture of silicate of soda and a ground mineral filler, said filler having an average particle size of between 8.4 and 11 microns.

2. A water resistant composition of matter comprising an intimate mixture of silicate of soda and ground limestone, the limestone having an average particle size of between 8.4 and 11 microns.

3. A water resistant composition of matter comprising an intimate mixture of silicate of soda and a filler of ground dolomitic limestone, said filler having a maximum concentration of particle surface occurring between particle sizes of 2.5 and 5 microns, said solution of silicate of soda containing from 0.38 to 0.17 parts of silicate of soda for each part of filler.

4. A water resistant composition of matter comprising an intimate mixture of silicate of soda and a filler of ground limestone, said filler having an average particle size of between 8.4 and 11 microns and being particularly free of particles less than 0.8 micron in diameter.

5. A dough-like mass for making a water resistant composition of matter comprising an intimate mixture of a solution of silicate of soda having a viscosity of at least 2000 centipoises at 25° C. and a ground mineral filler, said filler having an average particle size of between 8.4 and 11 microns.

6. The method of making a water resistant, hard porous structure of sodium silicate and a ground mineral filler which comprises grinding the filler so that its average particle size is between 8.4 and 11 microns, mixing said ground filler with a solution of silicate of soda having a viscosity of not less than 2000 centipoises at 25° C. to form a dough-like mass, and rapidly heating said dough-like mass to form a porous structure.

7. The method of making a water resisting, hard porous structure of sodium silicate and a filler of limestone which comprises grinding the limestone so that the average particle size is between 8.4 and 11 microns, mixing the ground limestone with a solution of silicate of soda having a viscosity of not less than 2000 centipoises at 25° C. to form a doughlike mass and rapidly heating said doughlike mass to form a porous structure.

In testimony whereof we affix our signatures.

OLIVER W. STOREY.
MAX KLIEFOTH.